United States Patent Office 2,757,175
Patented July 31, 1956

2,757,175

PIPERIDINE DERIVATIVES

Arthur Stoll, Arlesheim, and Jean-Pierre Bourquin, Basel, Switzerland, assignors to Sandoz, A. G., Basel, Switzerland No Drawing. Application June 21, 1954,
Serial No. 438,336

Claims priority, application Switzerland July 2, 1953

4 Claims. (Cl. 260—293.4)

The present invention relates to a process for the preparation of heterocyclic piperidine derivatives of the formula

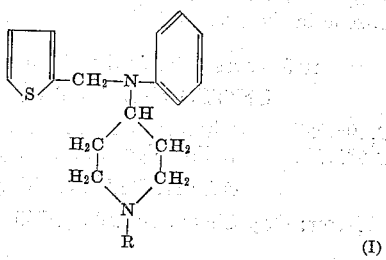

wherein R is methyl or ethyl. These heterocyclic piperidine derivatives possess excellent antihistaminic activity and, when administered for example orally, are characterized by low toxicity and good compatibility (freedom from undesired side reactions).

According to the present invention, these heterocyclic piperidine derivatives are prepared by condensing a secondary amine of the formula

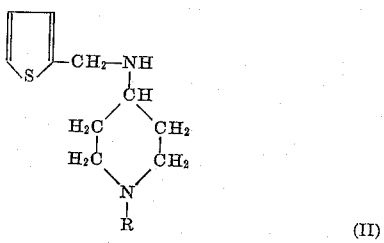

wherein R has the aforesaid significance, with halogenated benzene. The process is advantageously carried out in the pesence of a condensing agent such as an alkali carbonate (sodium carbonate, etc.) an alkali amide (sodamide, etc.) or copper powder, in the presence or absence of an organic solvent, and at room temperature (about 20 to about 30° C.) or with the application of heat.

The following examples set forth presently-preferred representative embodiments of the invention. These examples are intended to be solely illustrative and not at all restrictive. In the examples, the parts are by weight unless otherwise indicated, and the parts by weight bear the same relation to parts by volume as do grams to milliliters. Temperatures are in degrees centigrade.

Example 1

250.0 parts of 1-methyl-4-amino-N'-(2-thenyl)-piperidine (1 mol), 245.0 parts of potassium carbonate (1.5 mols), 280.0 parts of bromobenzene (1.5 mols) and 5.5 parts of copper powder in a stainless (V2A) steel autoclave having a capacity of 1500 parts by volume are heated for 40 hours to an oil-bath temperature of 200°. After cooling, the reaction mixture is dissolved in 750 parts by volume of water and 1000 parts by volume of aqueous hydrochloric acid (1:1 by weight strength), and the solution is shaken out with 750 parts by volume of ether. The aqueous layer is rendered alkaline to phenolphthalein with the aid of 550 parts by volume of concentrated aqueous caustic soda solution, after which it is extracted with a total of 1500 parts by volume of ether. The ethereal solution is dried over sodium sulfate and is then evaporated as far as possible under reduced pressure and at a bath temperature of 30°. Unreacted material (B. P. 145–155°/11 mm. Hg) is removed from the residue of the evaporation by distillation under the vacuum of a water-jet vacuum pump, after which the residue is fractionated under a high vacuum. The fraction going over between 170–190° at a pressure of 0.06 mm. Hg is impure 1-methyl-4-amino-N'-phenyl-N'-(2-thenyl)-piperidine.

For further purification of this product, 5.0 parts of the crude base are dissolved in 300 parts by volume of a mixture of equal parts of benzene and petroleum ether, and the solution is chromatographed on 500 parts of aluminum oxide. Eluation is carried out with benzene/ethanol (60:4) and after distilling off the solvent, the thus-isolated material is distilled under a high vacuum. The thus-purified material boils at 158–160° at a pressure of 0.02 mm. of mercury (218°/ 11 mm.). The distillate is recrystallized from a two-fold quantity of acetone; it melts at 95–97°.

The thus-prepared base—1-methyl-4-amino-N'-phenyl-N'-(2-thenyl)-piperidine—is converted into the tartrate by dissolving the base in the 30-fold quantity of absolute alcohol and adding the equivalent amount of tartaric acid. The melting point of the tartrate is 170–172°.

Example 2

By following the procedure set forth in Example 1, but replacing the 1-methyl-4-amino-N'-(2-thenyl)-piperidine by the equivalent quantity of 1-ethyl-4-amino-N'-(2-thenyl)-piperidine, the corresponding 1-ethyl-4-amino-N'-phenyl-N'-(2-thenyl)-piperidine is obtained.

Example 3

The procedure according to Example 1 is repeated, but 1.5 mols of chlorobenzene are employed instead of 1.5 mols of bromobenzene. The identical product is obtained.

Example 4

The procedure according to Example 2 is followed except that the 1.5 mols of bromobenzene are replaced by 1.5 mols of chlorobenzene. The identical product is obtained.

The 1-methyl- or 1-ethyl-4-amino-N'-(2-thenyl)-piperidine employed as starting material for the process of the present invention may be prepared by condensing the corresponding N-alkyl-4-amino-piperidine, in a suitable solvent medium such as benzene, with a 2-thenyl-halide such as 2-thenyl-chloride, with or without the aid of a condensing agent such as potassium carbonate.

Having thus disclosed the invention, what is claimed is:

1. A process for the preparation of a piperidine derivative of the formula

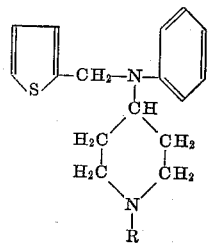

which comprises reacting a secondary amine of the formula

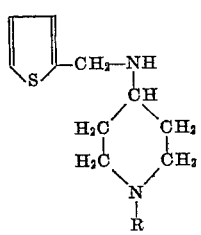

with halogenated benzene selected from the group consisting of bromobenzene and chlorobenzene in the presence of a condensing agent, R in the aforesaid formula representing an alkyl group with 1 to 2 carbon atoms.

2. A process for the preparation of a piperidine derivative of the formula

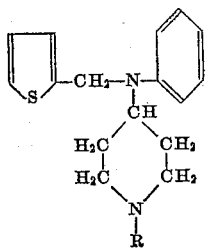

which comprises reacting a secondary amine of the formula

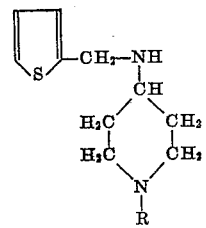

with bromobenzene in the presence of a condensing agent, R in the aforesaid formula representing an alkyl group with 1 to 2 carbon atoms.

3. A process for the preparation of 1-methyl-4-amino-N'-phenyl-N'-(2-thenyl)-piperidine which comprises reacting 1 - methyl - 4 - amino-N'-(2-thenyl)-piperidine with bromobenzene in the presence of a condensing agent.

4. A process for the preparation of 1-ethyl-4-amino-N'-phenyl-N'-(2-thenyl)-piperidine which comprises reacting 1-ethyl-4-amino-N'-(2-thenyl)-piperidine with bromobenzene in the presence of a condensing agent.

References Cited in the file of this patent

UNITED STATES PATENTS

| | | |
|---|---|---|
| 2,496,957 | Reitsema | Feb. 7, 1950 |
| 2,683,714 | Kallischnigg | July 13, 1954 |

OTHER REFERENCES

Karrer: Org. Chem., 2nd ed., p. 733 (Elsevier), 1946.